United States Patent
Theriot

[15] 3,679,983
[45] July 25, 1972

[54] PHASE DISTORTION DETECTOR FOR DETECTING PHASE DISTORTION ON A LINEARLY FREQUENCY MODULATED WAVEFORM

[72] Inventor: Eugene Joseph Theriot, Greensboro, N.C.
[73] Assignee: Bell Telephone Laboratories, Murray Hill, Berkeley Heights, N.J.
[22] Filed: Jan. 18, 1971
[21] Appl. No.: 107,002

[52] U.S. Cl. .......................... 329/110, 325/65, 325/474, 329/112, 329/131, 329/136, 332/18, 343/17.2 PC
[51] Int. Cl. .................................................... H03d 3/04
[58] Field of Search .................. 329/110, 112, 145, 131–136, 329/50, 168–173; 325/65, 474–476, 147, 42; 332/18, 37, 37 D, 17, 19; 343/17.2 PC

[56] References Cited

UNITED STATES PATENTS

| | | | |
|---|---|---|---|
| 3,392,337 | 7/1968 | Neuburger | 329/110 X |
| 2,580,148 | 12/1951 | Wirkler | 325/65 X |
| 2,501,355 | 3/1950 | Pratt | 332/18 |
| 2,923,887 | 2/1960 | Aiken | 332/17 X |
| 2,846,572 | 8/1958 | Elliott | 332/19 X |
| 2,849,537 | 8/1958 | Eglin | 325/65 |
| 3,213,367 | 10/1965 | Ravenscroft | 332/19 X |

*Primary Examiner*—Alfred L. Brody
*Attorney*—R. J. Guenther and Kenneth B. Hamlin

[57] ABSTRACT

A phase distortion detector is used to detect phase distortion on a pulsed linearly frequency modulated waveform, commonly known as a chirp radar pulse. The detector mixes two differently delayed components of the chirp pulse to produce a constant difference frequency component, from which the phase modulation envelope is recovered to generate an error signal proportional to the phase distortion on the chirp pulse. The detector is utilized with a phase modulator in a feedback arrangement to compensate a chirp pulse dynamically for undesirable phase distortion. The detector is also used in another combination with a phase modulator and an amplitude equalizer to compensate a chirp pulse dynamically for both undesirable amplitude distortion and phase distortion.

5 Claims, 5 Drawing Figures

INVENTOR
E. J. THERIOT
BY
ATTORNEY

PHASE DISTORTION DETECTOR FOR DETECTING PHASE DISTORTION ON A LINEARLY FREQUENCY MODULATED WAVEFORM

BACKGROUND OF THE INVENTION

1. Field of the Invention

This invention pertains to the field of pulsed phase modulated communications systems, and more particularly to apparatus for detecting and correcting undesirable phase and amplitude distortion which arises during the generation and transmission of a pulsed linearly frequency modulated signal.

2. Description of the Prior Art

Pulse compression radar systems, commonly referred to as chirp radar systems, are distinctive in that they radiate relatively low-amplitude, long-duration, pulsed microwave signals whose frequency components are dispersed in a predetermined manner. These characteristics are taken advantage of in a radar receiver by compressing the received pulses into relatively high-amplitude, short-duration pulses.

Briefly, this technique serves to improve certain range and target resolution parameters which are criteria used to measure radar system performance. Further discussion on the theory and operation of chirp radar systems can be found in the article entitled "The Theory and Design of Chirp Radars," J. R. Klauder et al, *Bell System Technical Journal*, pp. 745–808, Vol. 39 (July 1960).

For practical considerations, chirp radar pulses are usually dispersed in a linear fashion; hence, pulsed linearly frequency modulated radar waveforms form an important class of compressed pulse signals. It is during the generation and transmission of this class of radar signals that undesirable incidental phase and amplitude modulation, also known as phase and amplitude distortion, is often introduced onto the radar signals and tends to degrade the radar performance.

Prior attempts to solve this problem have resulted in various amplitude or phase compensation schemes, or combinations thereof, which have required memory means to store time-invariant distortion information. However, these schemes suffer from a number of limitations. One problem is that in actual chirp radar system environments the phase and amplitude distortion characteristics are often time-variant. A second problem is that some means is required to measure the distortion. As a result, such systems would benefit from dynamic distortion compensation capabilities which cannot be provided by compensation schemes utilizing memory means storing time-invariant distortion information.

It is, therefore, an object of this invention to produce dynamically an output voltage proportional to the incidental phase distortion components in a pulsed linearly frequency dispersed waveform.

It is another object of this invention to compensate dynamically a pulsed linearly frequency dispersed waveform for undesirable phase distortion.

It is yet another object of this invention to compensate dynamically a pulsed linearly frequency dispersed waveform for both undesirable phase distortion and amplitude distortion.

BRIEF SUMMARY OF THE INVENTION

The invention comprises a phase modulation detector which detects undesirable phase distortion on a pulsed linearly frequency modulated waveform, hereinafter known as a chirp pulse or chirp waveform. The detector produces an output voltage proportional to the undesirable phase distortion components in a chirp waveform by mixing differently delayed components of the waveform, extracting the resultant difference frequency component, and detecting the phase modulation components therein which are proportional to the phase distortion on the chirp waveform.

A feature of the invention is that the detector dynamically detects time-variant phase distortion on a chirp pulse on a real-time basis.

Another feature of the invention is that the detector can be embodied within a degenerative feedback loop of a phase modulator to comprise a signal-phase equalizer for dynamically compensating chirp pulses for phase distortion on a real-time basis.

These and further features of the invention, its nature and various advantages, will become more apparent upon consideration of the attached drawings and of the following detailed description.

DETAILED DESCRIPTION

Figure 1:
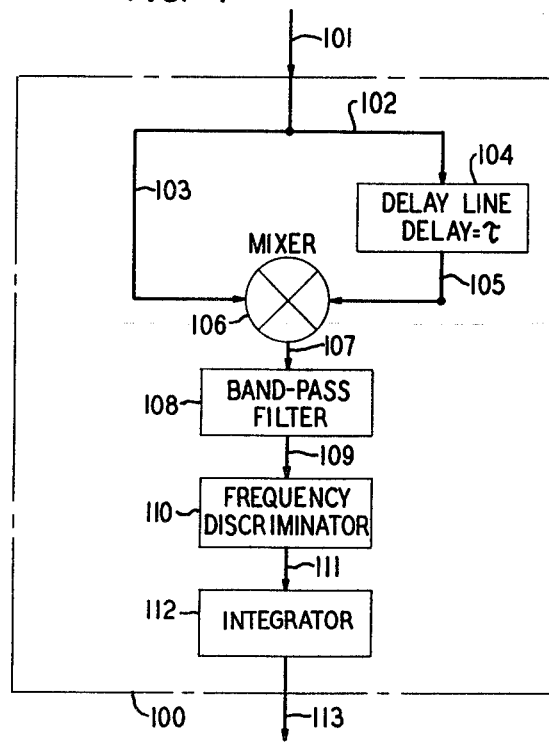
FIG. 1 shows a phase modulation detector for detecting phase distortion on a chirp pulse.

A phase modulation detector 100 for detecting phase distortion on a chirp waveform is shown in FIG. 1.

The detector 100 is a device comprising the following elements. An input lead 101 for the detector 100 is connected to two input leads 102 and 103. Lead 103 is the first of two input leads to a mixer 106 which produces on an output lead 107 sum and difference frequency components of signals coupled onto the respective input leads 103 and 105.

Mixer 106 can generally be any one of a broad class of non-linear amplitude modulators which produce sum and difference frequency components from the input signals. A specific example of such a modulator is shown in FIG. 9–22 on page 427 of *Electronic Circuits*, Samuel Seely, New York: Holt, Rinehart and Winston, Inc., 1968.

Lead 102 is the input lead of a delay line 104 which delays an input signal of duration T for a delay interval $\tau$, $\tau$ typically being several orders of magnitude smaller than T. Delay line 104 can be any one of a general type of delay lines which are capable of delaying an input pulse for the relatively short interval $\tau$ with respect to the pulse duration T. Examples of such a delay line are shown in FIGS. C-1 through C-7 on pages 800–808 in *Pulse, Digital, and Switching Waveforms*, Jacob Millman and Herbert Taub, New York: McGraw-Hill Book Company, 1965.

The output of delay line 104 is connected through the second input lead 105 of mixer 106 for the purpose of coupling into the mixer 106 a delayed replica of any input signal which is directly coupled through the first input lead 103 into the other input of mixer 106.

As a result of the coupling of the differently delayed components of the input signal into mixer 106, sum and difference frequency components of the input signal are generated on the output lead 107 of mixer 106. Lead 107 of mixer 106 is connected to the input of a bandpass filter 108 in which the sum frequency components and insignificant difference frequency components are blocked, and the most significant difference frequency component is passed onto an output lead 109. Bandpass filter 108 can be any one of a class of filters which can be tuned to effectively pass only a selected narrow band of components from a plurality of modulation products. An example of such a filter is shown in FIG. 9–22 on page 427 in the forenamed *Electronic Circuits* reference.

Lead 109 is connected to the input of a frequency discriminator 110 in which the frequency modulation envelope of the most significant difference frequency component is recovered and passed onto an output lead 111. Frequency discriminator 110 can be any one of a broad class of discriminator circuits which are capable of recovering the frequency modulation envelope of the narrow band of components passed by filter 108. An example of such a discriminator is shown in FIG. 9-39 on page 444 in the forenamed *Electronics Circuits* reference.

Output lead 111 of frequency discriminator 110 is connected to the input of an integrator 112 for integrating the frequency modulation envelope to produce on an output lead 113 an error signal proportional to phase modulation components in the input signal. Integrator 112 can be any circuit capable of integrating the frequency modulation envelope recovered by discriminator 110 to produce the desired error signal. An example of such an integrating circuit is respectively shown and discussed in FIG. 2-14 on page 43 and on pages 49-50 in the forenamed *Pulse, Digital, and Switching Waveforms* reference.

If the input signal to detector 100 is a chirp pulse, the phase modulation components appearing on output lead 113 will be proportional to the incidental phase modulation on the input waveform. Incidental phase modulation, or phase distortion, with respect to a chirp pulse refers to the sum of all possible phase modulation components within the chirp pulse with the exception of those components which have a second-order functional dependence on time. In other words, if all of the phase modulation components within a chirp pulse were expressed in a power series as terms which were a function of time, the phase distortion components would individually correspond to those component terms of the power series which did not exhibit a second-order functional dependence on time.

Ideally, a chirp pulse has only phase modulation components of second-order with respect to time, which are inherently due to the linear frequency modulation. Hence, such a waveform is said to exhibit quadratic phase modulation. However, if the frequency modulation is not precisely linear, other order phase modulation terms will appear as phase distortion components and it is desirable to obtain a signal proportional to a sum of these other order components as a measure of the phase distortion.

Generally, for practical reasons, chirp pulses are typically signals within the microwave spectrum but, as can be witnessed from the following operative example, nothing precludes the detector 100 from functioning for chirp pulses in other frequency ranges as well.

Figure 5:
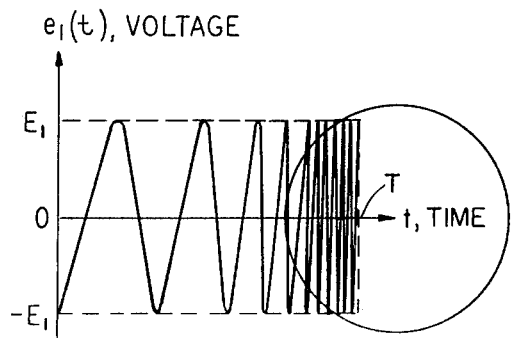
FIG. 5 illustrates an amplitude-versus-time plot characteristic of a chirp waveform.

As an operative example of how detector 100 functions, consider the chirp pulse shown in FIG. 5 which is represented by $$e_1(t) = \begin{cases} E_1 \sin(\omega(t) \cdot t + \phi(t)), & 0 < t < T, \\ 0, & t > T \text{ and } t < 0. \end{cases} \quad (1)$$

$E_1$ is the envelope amplitude of the pulse $e_1(t)$; T is the pulse duration; $\omega(t)$ is the instantaneous frequency of the pulse; $t$ is the variable of time; and $\phi(t)$ represents the phase distortion components which are a function of time.

In order to have linear frequency modulation $\omega(t)$ is represented by $$\omega(t) = \begin{cases} 2\pi\left(f_0 + \frac{Bt}{T}\right), & 0 < t < T, \\ 0, & t > T \text{ and } t < 0. \end{cases} \quad (2)$$

B is the bandwidth over which the frequency of the chirp pulse is swept during the pulse duration T and $f_0$ is the instantaneous frequency of the pulse at the beginning of the pulse duration T; i.e., at $t=0$.

The phase distortion components $\phi(t)$ of $e_1(t)$ can be expressed as an odd function with respect to time. The significance of this expression is that $\phi(t)$ can be represented by the Fourier sine series shown below in equation 3.

$$\phi(t) \cong \begin{cases} \sum_{n=1}^{N} K_n \sin \frac{n\pi t}{T}, & 0 < t < T, \\ 0, & t > T \text{ and } t < 0. \end{cases} \quad (3)$$

$K_n$ is a multiplicative constant dependent upon the index variable n incremented from 1 to N.

N is the number of significant terms of the Fourier sine series representing $\phi(t)$ and nominally depends upon the magnitude of the phase distortion on the chirp pulse $e_1(t)$. If the phase distortion on $e_1(t)$ is nominal, N will be quite small. However, if the phase distortion on $e_1(t)$ is fairly severe, N will usually be quite large. In other words, the Fourier sine series will converge rapidly for minimal phase distortion in a reasonably small number of terms and will converge very slowly for severe phase distortion.

For example, in modern chirp radar systems, N will typically not exceed 30 for an uncompensated chirp pulse. That is, the Fourier sine series expansion for the phase distortion components $\phi(t)$ will typically contain 30 terms or less for the worst character of phase distortion usually encountered in actual chirp radar system environments. However, it is possible to correct dynamically the phase distortion on a distorted chirp pulse by passing the pulse through the phase distortion equalizer shown in FIG. 2. Phase compensation of the chirp pulse in this manner effectively causes both the phase distortion $\phi(t)$ and the relative measure of the phase distortion N, to approach zero as the pulse is dynamically compensated. If $e_1(t)$ is applied to lead 101 of detector 100, $e_1(t)$ is directly coupled into input 103 of mixer 106, and a delayed replica of $e_1(t)$ represented by $e_2(t)$, is coupled into the other input 105 of mixer 106. The delayed replica of $e_1(t)$, $e_2(t)$, is produced by passing $e_1(t)$ through delay line 104 with a uniform delay $\tau$.

$$e_2(t) = e_1(t-\tau) \cong \begin{cases} E_2 \sin(\omega(t-\tau) \cdot (t-\tau) \\ + \phi(t-\tau)), & \tau < t < (T+\tau) \\ 0, & \tau > t \text{ and } t > (T+\tau) \end{cases} \quad (4)$$

$E_2$ is the envelope amplitude of $e_2(t)$ and is proportional to $E_1$.

Sum and difference frequency components and other modulation products are respectively generated by the nonlinear mixing of $e_1(t)$ and $e_2(t)$ on output lead 107 of mixer 106. An important criteria in designing the pass-band of bandpass filter 108 is the selection of the pass-band so that only the most significant difference frequency component $e_3(t)$ from among all of the modulation products produced by mixer 106 is passed onto lead 109 by bandpass filter 108.

$$e_3(t) = E_3 \sin\left(\omega(t-\tau) \cdot (t-\tau) - \omega(t) \cdot t + \phi(t-\tau) - \phi(t)\right), 0 < t < (T+\tau) \quad (5)$$

$E_3$ is the envelope amplitude of $e_3(t)$ and is proportional to $E_2$.

It is readily apparent from equation (5) and the preceding part of the operative example that the detector will optimally function with input waveforms which are precisely linearly frequency modulated. However, the detector 100 will also adequately function for waveforms with frequency modulation which is not precisely linear as long as the frequency of $e_3(t)$ remains within the pass-band of bandpass filter 108 over the interval $0<t<(T+\tau)$. That is, the frequency of $e_3(t)$, expressed by the term $(\omega(t-\tau) - \omega(t), \tau < t < T+\tau)$, must be within the pass-band of bandpass filter 108 over the entire interval $0<t<(T+\tau)$. Hence, the detector 100 will function for chirp pulses with a fairly substantial amount of deviation from a precisely linear frequency dispersion as long as the deviation from linearity is not to the extent that $e_3(t)$ cannot be exclusively passed through bandpass filter 108 without distortion.

By substituting equations 2 and 3 into equation 5 $e_3(t)$ can also be expressed as $$e_3(t) = E_3 \sin\left[\frac{4\pi B\tau t}{T} + \sum_{n=1}^{N} K_n \left(\sin\frac{n\pi(t-\tau)}{T} - \sin\frac{n\pi t}{T}\right) + \theta\right], \quad 0 < t < (T+\tau). \tag{6}$$

$\theta$ is a constant term containing all of the time-independent terms within the argument enclosed in brackets of the sine function expressed by equation 6.

Equation 6 can be recognized as a sinusoidal signal with complex frequency modulation and a carrier frequency $f$, where $$f = 2B\tau/T \tag{7}$$

The frequency modulation envelope of $e_3(t)$, represented by $e_4(t)$, is obtained by passing $e_3(t)$ through frequency discriminator 110 to yield $e_4(t)$ on output lead 111.

$$e_4(t) = E_4 \sum_{n=1}^{N} K_n \left(\sin\frac{n\pi(t-\tau)}{T} - \sin\frac{n\pi t}{T}\right), \quad 0 < t < (T+\tau). \tag{8}$$

$E_4$ is the envelope amplitude of $e_4(t)$ and is proportional to $e_3(t)$.

Finally, a term proportional to the incidental phase distortion $\phi(t)$ is obtained by passing $e_4(t)$ through integrator 112 to produce $e_5(t)$ on output lead 113 of integrator 112.

$$e_5(t) = \int_{t=0}^{t=(T+\tau)} e_4(t)\,dt \tag{9}$$

$$e_5(t) = E_5 \sum_{n=1}^{N} \frac{K_n T}{n\pi}\left[-2\sin\left(\frac{n\pi t}{T}\right) - \frac{n\pi\tau}{2T}\right)\cdot \sin\left(\frac{n\pi\tau}{2T}\right)\right], \quad 0 < t < (\tau+T). \tag{10}$$

$E_5$ is the envelope amplitude of $e_5(t)$ and is proportional to $E_4$.

By requiring the delay interval $\tau$ of delay line 104 to be several orders of magnitude smaller than the pulse duration T, the error signal $e_5(t)$ can be expressed as $$\lim_{\tau \to 0} e_5(t) \cong -E_5 \sum_{n=1}^{N} K_n \sin\left(\frac{n\pi t}{T}\right) \tag{11}$$

Substituting equation 3 into equation 11 yields:

$$\lim_{\tau \to 0} e_5(t) \cong -E_5 \phi(t). \tag{12}$$

It is therefore evident from equation 12 that the phase distortion detector does indeed produce an error-signal voltage which is of opposite sense and proportional to the phase distortion components $\phi(t)$ present in the input chirp pulse $e_1(t)$.

Therefore, the only restrictions of consequence on the waveform $e_1(t)$, necessary to justify the approximation made in equation 11, are that $e_1(t)$ should be substantially linearly frequency modulated and that the phase distortion $\phi(t)$ of $e_1(t)$ should require a limited number N of terms in its Fourier sine series expansion.

Figure 2:
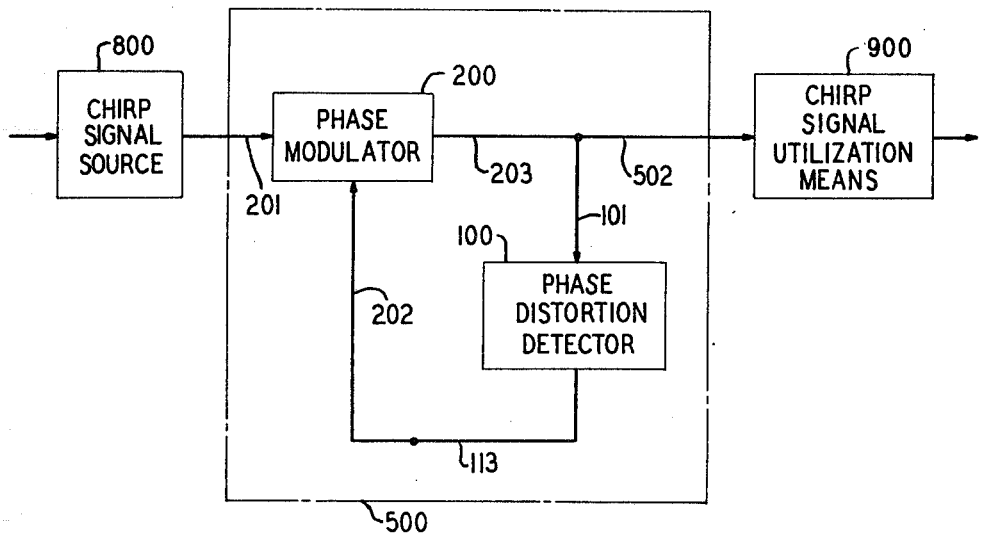
FIG. 2 depicts a signal-phase equalizer which utilizes the detector shown in FIG. 1 to compensate dynamically a chirp pulse for phase distortion.

Another feature, in accordance with this aspect of the invention, is the signal-phase equalizer 500, shown in FIG. 2 which utilizes phase distortion detector 100.

Phase equalizer 500 is a device comprising phase distortion detector 100 and a phase modulator 200 connected between a chirp signal source 800 and a chirp signal utilization means 900. Modulator 200 phase modulates an input signal applied to an input lead 201 in response to a modulating voltage applied to a modulating input lead 202, and produces the phase modulated signal on an output lead 203.

The input lead 201 of phase modulator 200 also serves as the input lead for equalizer 500. The output lead 203 of modulator 200 is connected both to an output lead 502 of equalizer 500 and to the input lead 101 of phase distortion detector 100. The output lead 113 of detector 100 is connected to the modulating input lead 202 of phase modulator 200.

Phase modulator 200 can be any phase modulator capable of utilizing the error signal produced by detector 100 as a phase modulating signal to compensate dynamically an input chirp pulse for phase distortion. An example of such a phase modulator is respectively shown and discussed in FIG. 9-12 on page 417 and on pages 439-440 in the aforenamed *Electronic Circuits*.

As is apparent from FIG. 2, if a chirp pulse containing phase distortion is coupled onto lead 201 through phase modulator 200 and through leads 203 and 101 into phase distortion detector 100, detector 100 will produce on lead 113 an error-signal voltage of opposite sense and proportional to the phase distortion components on the chirp pulse. This error-signal voltage, advantageously having an opposite sense from that of the sum of the distortion components in the input signal waveform, is coupled through leads 113 and 202 into the modulating input of phase modulator 200. Therein the phase distortion components are dynamically compensated for according to well known degenerative feedback principles. In other words, an error signal proportional to the phase distortion on the chirp pulse is produced in phase distortion detector 100 and is fed back to phase modulator 200 wherein the phase distortion is dynamically stripped from the chirp pulse.

If the chirp pulse applied to lead 201 contains no phase distortion, no error signal will be produced on lead 113 and coupled onto the modulating input lead 202 of phase modulator 200. Consequently, an undistorted chirp pulse would pass without significant change through phase equalizer 500.

In summary, the signal-phase equalizer 500 shown in FIG. 2 employs phase detector 100 in combination with phase modulator 200 to compensate a chirp input pulse dynamically for phase distortion which is incidental to the quadratic phase modulation components inherent in an ideal chirp pulse.

Figure 3:
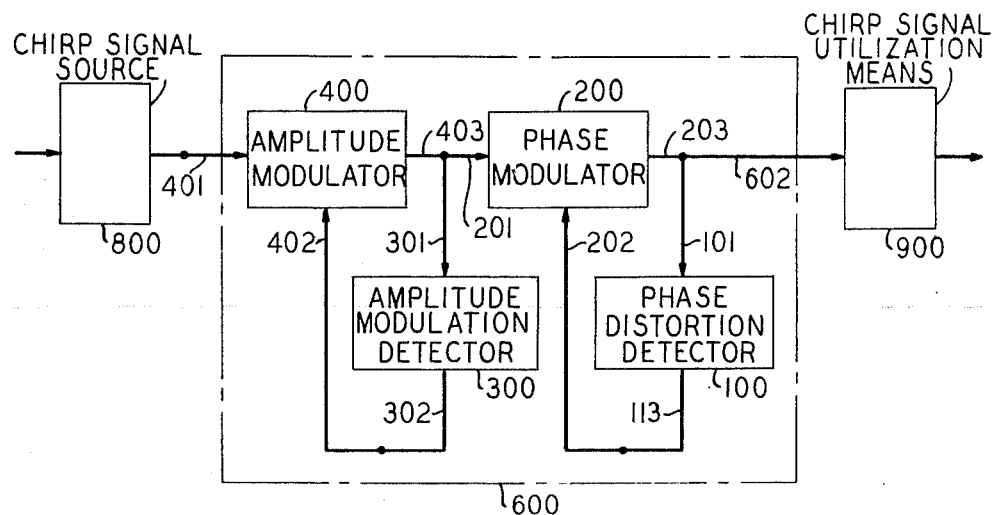
FIG. 3 shows a signal-phase and signal-amplitude equalizer which uses the detector shown in FIG. 1 to compensate dynamically a chirp pulse for both amplitude distortion and phase distortion.

A still further feature, in accordance with this aspect of the invention is a signal-phase and signal-amplitude equalizer 600 shown in FIG. 3. Equalizer 600 combines all of the features of the signal-phase equalizer 500 shown in FIG. 2 with the additional feature of an amplitude modulator 400 and an amplitude modulation detector 300 connected together in a similar degenerative feedback combination to also provide amplitude equalization.

Amplitude modulation detector 300 can be any circuit capable of detecting deviation from the desired constant amplitude characteristic of an ideal chirp pulse and capable of producing an output voltage of opposite sense and proportional to the detected deviation. Amplitude modulation 400 can be any modulator capable of amplitude modulating a chirp pulse input in response to the output voltage produced by detector 300. Examples of such circuits can be seen in FIGS. 9-16 and 9-5 on pages 421 and 411, respectively, in the aforenamed *Electronic Circuits*.

Amplitude equalization of the chirp pulse to maintain a nominally flat amplitude-versus-time characteristic is desirable for an important reason. Most frequency discriminators of the type used for discriminator 110 are somewhat signal-amplitude sensitive. Therefore, in order to obtain a more accurate error signal in detector 100, it is advantageous to first compensate the chirp pulse for amplitude distortion before passing the pulse through the distortion detector 100. This insures that the error signal produced on lead 113 of phase distortion detector 100 will be truly indicative of the phase distortion only and will not reflect signal-amplitude error as well.

Input lead 401 to equalizer 600 connects chirp signal source 800 to amplitude modulator 400. Chirp pulses coupled from source 800 through lead 401 into modulator 400 are amplitude modulated in response to a modulating voltage applied to a modulating input lead 402. The modulated signal is produced on an output lead 403 of amplitude modulator 400.

Output lead 403 is connected to an input lead 301 to amplitude modulation detector 300 for detecting amplitude envelope distortion on the chirp pulse. Amplitude modulation detector 300 develops an error-signal voltage of opposite sense and proportional to any undesirable amplitude envelope distortion pulse on the chirp pulse passing through modulator 400 onto lead 301.

This voltage is then coupled back to modulator 400 through an output lead 302 of detector 300 which is connected to modulating input lead 402 of modulator 400. Hence, it is apparent that amplitude modulating detector 300 is connected in a degenerative feedback loop around amplitude modulator 400. This feedback compensation serves to compensate a chirp pulse input dynamically for deviation from the "flat-top" amplitude-versus-time characteristic desirable in an ideal chirp pulse.

The other principal elements of signal-phase and signal-amplitude equalizer are the same as described for the signal-phase equalizer 400. Output lead 403 is also connected to the input lead 201 of phase modulator 200. The output lead 203 of modulator 200 is connected both to the output lead 602 of equalizer 600, and to the input lead 101 of phase distortion detector 100. Finally, output lead 113 of detector 100 is connected to the modulating input lead 202 of phase modulator 200, and output lead 602 connects to a chirp signal utilization means 900.

In summary, the signal-phase and signal-amplitude equalizer dynamically compensates a chirp pulse for amplitude envelope distortion and phase distortion on a real-time basis.

Figure 4:
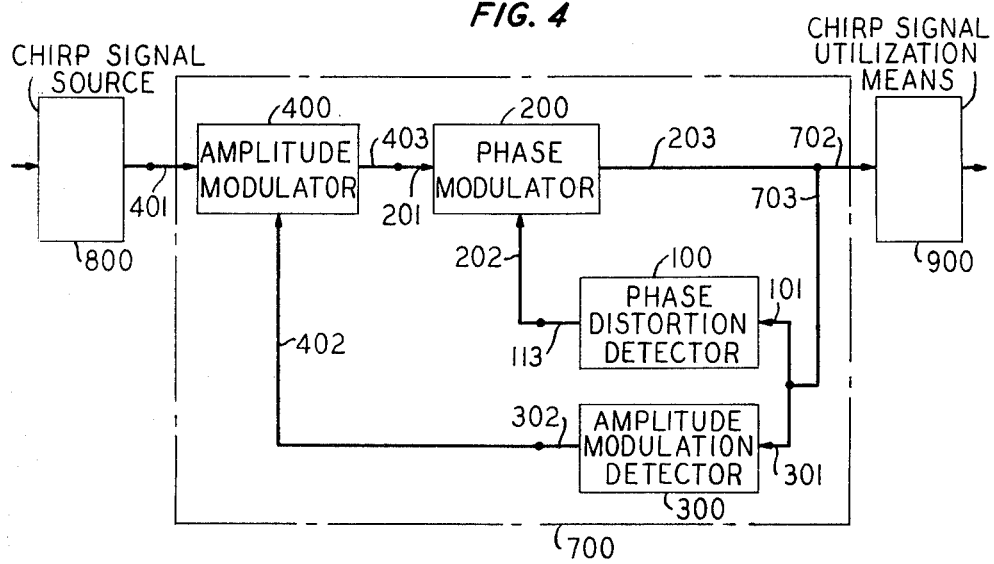
FIG. 4 shows another embodiment of a signal-phase and signal-amplitude equalizer similar to the equalizer shown in FIG. 3.

Yet another feature, in accordance with this aspect of the invention, is another embodiment of a signal-phase and signal-amplitude equalizer 700 as shown in FIG. 4. Equalizer 700 particularly shows the feature that the compensating loops, or error-signal feedback loops, can also be "nested," or wholly contained within one another.

Equalizer 700 essentially contains all of the principal elements and operates on the same principles as equalizer 600 shown in FIG. 3. The main distinctions between equalizer 600 and 700 are concerned with the points between which the respective error-signal feedback loops are connected. In equalizer 600 the chirp pulse is sampled for amplitude envelope distortion at the junction of leads 403 and 201 between the output of amplitude modulator 400 and the input of phase modulator 200. The chirp pulse is sampled for phase distortion on the output of phase modulator 200 at the junction of leads 203 and 602. However, in equalizer 700 the chirp pulse is sampled for both envelope distortion and phase distortion on the output of phase modulator 200 at the junction of leads 203 and 702.

Hence, in equalizer 600 the amplitude distortion compensation takes place in a feedback loop which is independent of the error-signal feedback loop in which the phase distortion compensation occurs. While in equalizer 700 the feedback loop, in which the phase distortion compensation is effected, is wholly contained within, or is said to be "nested" within, the amplitude distortion compensation feedback loop.

In summary, the signal-phase and signal-amplitude equalizer 700 also dynamically compensates a chirp pulse for amplitude envelope distortion and phase distortion on a real-time basis.

It is to be understood that the embodiments shown and described herein are only illustrative of the principles of this invention, and that modifications of this invention may be implemented by those skilled in the art without departing from the spirit and scope of the invention.

What is claimed is:

1. In a system utilizing a pulsed linearly frequency-dispersed waveform, a phase distortion detector comprising:
    means for delaying said waveform for a predetermined interval;
    means for mixing said waveform and said delayed waveform to generate sum and difference frequency components thereof;
    means for extracting the most significant of said difference frequency components;
    means for detecting the frequency-modulation envelope of said most significant component; and
    means for integrating said frequency-modulation envelope to produce an error signal proportional to any phase distortion on said linearly frequency-dispersed waveform.

2. The system in accordance with claim 1 in which a signal phase equalizer is provided, said equalizer comprising:
    a phase modulator having a signal input into which said linearly frequency-dispersed waveform is coupled;
    means for applying the modulated output signal of said modulator to said delaying means and said mixing means of said detector; and
    means for coupling said error signal from the output of said integrating means of said detector to the modulating signal input of said phase modulator, such that substantially all but the second-order phase modulation components are dynamically stripped from said waveform.

3. The phase distortion detector in accordance with claim 1 in which
    said delaying means includes means for delaying said waveform for a first interval that is at least one order of magnitude less than the duration of said waveform; and
    said integrating means is configured to operate on said frequency modulation envelope for a predetermined second interval sufficient to cause said error signal to be proportional to the sum of those phase modulation components of said linearly frequency-dispersed waveform which vary other than as second-order functions of time.

4. In a system employing pulsed, linearly frequency modulated, sinusoidal signals of predetermined durations, a distortion detector comprising:
    means for delaying for a first interval a distorted one of said pulsed signals which includes components having frequencies that vary other than linearly with time and relative phase differences that vary other than quadratically with time, said first interval being at least one order of magnitude less than the duration of each of said pulsed signals;
    an amplitude modulator for mixing said distorted signal and said delayed distorted signal to produce sum and difference frequency components of the mixed signals;
    a band-pass filter for extracting the principal difference component from said sum and difference components of said mixed signals;
    a frequency discriminator for detecting the frequency modulation envelope of said principal difference component; and
    an integrator for integrating said frequency modulation envelope over a second interval equivalent to the duration of said distorted signal and said first interval to produce an error signal consisting essentially of components proportional to those components of said distorted signal which have relative phase differences that vary other than quadratically with time.

5. The method of producing an error signal proportional to the phase distortion components in a pulsed, linearly frequency modulated, sinusoidal waveform comprising the steps of:

delaying said waveform for a first interval;

mixing said waveform and said delayed waveform to produce sum and difference frequency components of the mixed waveforms;

extracting the principal difference component from said sum and difference components;

detecting the frequency modulation envelope of said principal difference component; and integrating said envelope to produce an error signal proportional to those phase modulation components of said waveform which vary other than quadratically with time.

* * * * *